United States Patent
Wang

(10) Patent No.: US 12,117,884 B2
(45) Date of Patent: *Oct. 15, 2024

(54) OPTICAL SENSOR DEVICE HAVING SENSING PIXELS AND SELF-POWERED PIXELS

(71) Applicant: PixArt Imaging Inc., Hsin-Chu County (TW)

(72) Inventor: Guo-Zhen Wang, Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/222,468

(22) Filed: Jul. 16, 2023

(65) Prior Publication Data

US 2023/0359264 A1 Nov. 9, 2023

Related U.S. Application Data

(63) Continuation of application No. 17/380,660, filed on Jul. 20, 2021, now Pat. No. 11,740,684, which is a (Continued)

(30) Foreign Application Priority Data

Jan. 27, 2016 (TW) .................................. 105102500

(51) Int. Cl.
*G06F 1/3234* (2019.01)
*G06F 3/03* (2006.01)
(Continued)

(52) U.S. Cl.
CPC .......... *G06F 1/3259* (2013.01); *G06F 3/0317* (2013.01); *G06F 3/0354* (2013.01);
(Continued)

(58) Field of Classification Search
CPC ............... G06F 3/0354; G06F 3/03541; G06F 3/03543; G06F 3/038; G06F 1/3259; G06F 3/033–0395

See application file for complete search history.

(56) References Cited

U.S. PATENT DOCUMENTS

| 4,812,737 A * | 3/1989 | Fleck | ..................... G05F 1/62 323/283 |
| 6,686,903 B1 * | 2/2004 | Peng | ............... G06F 3/03543 345/163 |

(Continued)

FOREIGN PATENT DOCUMENTS

CN            101095339 B  * 12/2012  ............. H04N 3/155

*Primary Examiner* — Patrick F Marinelli
(74) *Attorney, Agent, or Firm* — Bruce Stone LLP; Joseph A. Bruce

(57) ABSTRACT

A sensor device includes an image sensing array, a frame buffer, a first read line, a second read line and an energy accumulator. The image sensing array is configured to sense reflected light from a working surface and includes a plurality of sensing pixels and a plurality of self-powered pixels. The sensing pixels respectively output image data according to the sensed reflected light. The self-powered pixels respectively output photocurrent according to the sensed reflected light. The first read line is coupled between the sensing pixels and the frame buffer. The second read line is coupled between the self-powered pixels and the frame buffer. The energy accumulator stores electrical energy of the photocurrent via a charge path between the self-powered pixels and the energy accumulator.

18 Claims, 4 Drawing Sheets

Related U.S. Application Data continuation of application No. 16/826,751, filed on Mar. 23, 2020, now Pat. No. 11,099,624, which is a continuation of application No. 16/055,250, filed on Aug. 6, 2018, now Pat. No. 10,635,156, which is a continuation of application No. 15/283,842, filed on Oct. 3, 2016, now Pat. No. 10,108,248.

(51) Int. Cl.
  *G06F 3/0354* (2013.01)
  *G06F 3/038* (2013.01)

(52) U.S. Cl.
  CPC .......... *G06F 3/03543* (2013.01); *G06F 3/038* (2013.01); *Y02D 10/00* (2018.01)

(56) References Cited

U.S. PATENT DOCUMENTS

| | | | | |
|---|---|---|---|---|
| 6,801,967 B2* | 10/2004 | Nakamura | G06F 3/038 | 710/62 |
| 6,903,725 B2* | 6/2005 | Nacson | G06F 3/03543 | 345/163 |
| 8,077,148 B2* | 12/2011 | Chien | G06F 3/03543 | 345/163 |
| 8,384,690 B2* | 2/2013 | Anderson | G06F 3/0421 | 345/173 |
| 9,342,161 B2* | 5/2016 | Pang | G06F 3/03543 | |
| 9,383,833 B2* | 7/2016 | Lye | G06F 1/3259 | |
| 9,385,158 B2* | 7/2016 | Lim | G06F 3/0304 | |
| 9,923,411 B2* | 3/2018 | Utsunomiya | H02J 7/35 | |
| 10,108,248 B2* | 10/2018 | Wang | G06F 1/3259 | |
| 10,491,849 B2* | 11/2019 | Pang | H04N 23/73 | |
| 10,635,156 B2* | 4/2020 | Wang | G06F 3/03543 | |
| 11,099,624 B2* | 8/2021 | Wang | G06F 3/0354 | |
| 2001/0054744 A1* | 12/2001 | Scott-Thomas | H04N 25/76 | 348/E3.018 |
| 2002/0061739 A1* | 5/2002 | Nakamura | G06F 3/038 | 455/343.1 |
| 2002/0118173 A1* | 8/2002 | Nacson | G06F 3/03543 | 345/163 |
| 2003/0103039 A1* | 6/2003 | Burr | G06F 3/03543 | 345/163 |
| 2004/0196262 A1* | 10/2004 | Poltorak | G06F 3/033 | 345/163 |
| 2005/0285043 A1* | 12/2005 | Nascetti | H04N 5/32 | 250/370.09 |
| 2006/0170491 A1* | 8/2006 | Wany | H01L 27/14609 | 348/E3.018 |
| 2006/0221055 A1* | 10/2006 | Chang | G06F 3/03543 | 345/163 |
| 2008/0158157 A1* | 7/2008 | Chang | G06F 3/03543 | 345/163 |
| 2009/0184925 A1* | 7/2009 | Chien | G06F 3/03543 | 345/163 |
| 2009/0294636 A1* | 12/2009 | Degrauwe | H02S 99/00 | 250/221 |
| 2010/0060234 A1* | 3/2010 | Nacson | H02J 7/32 | 310/75 R |
| 2011/0279399 A1* | 11/2011 | Anderson | H01L 27/142 | 345/173 |
| 2013/0002554 A1* | 1/2013 | Hsieh | G06F 1/32 | 345/163 |
| 2014/0300548 A1* | 10/2014 | Lye | G06F 3/03543 | 345/163 |
| 2015/0042566 A1* | 2/2015 | Lim | G06F 3/03543 | 250/214 R |
| 2015/0277588 A1* | 10/2015 | Pang | G06F 3/0383 | 345/166 |
| 2016/0041633 A1* | 2/2016 | Weng | G06F 3/03543 | 345/163 |
| 2016/0041634 A1* | 2/2016 | Weng | H02K 7/1853 | 345/163 |
| 2017/0005508 A1* | 1/2017 | Utsunomiya | G06F 3/0383 | |
| 2017/0099422 A1* | 4/2017 | Goma | H04N 25/57 | |
| 2017/0212578 A1* | 7/2017 | Wang | G06F 3/0317 | |
| 2018/0341316 A1* | 11/2018 | Wang | G06F 3/0317 | |
| 2020/0225729 A1* | 7/2020 | Wang | G06F 3/0317 | |
| 2021/0349520 A1* | 11/2021 | Wang | G06F 3/0354 | |
| 2023/0359264 A1* | 11/2023 | Wang | G06F 3/0354 | |

\* cited by examiner

OPTICAL SENSOR DEVICE HAVING SENSING PIXELS AND SELF-POWERED PIXELS

CROSS REFERENCE TO RELATED APPLICATION

This application is a continuation application of U.S. application Ser. No. 17/380,660, filed on Jul. 20, 2021, which is a continuation application of U.S. application Ser. No. 16/826,751, filed on Mar. 23, 2020, which is a continuation application of U.S. application Ser. No. 16/055,250, filed on Aug. 6, 2018, which is a continuation application of U.S. application Ser. No. 15/283,842, filed on Oct. 3, 2016, which claims the priority benefit of Taiwan Patent Application Serial Number 105102500, filed on Jan. 27, 2016, the full disclosures of which are incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical mouse device, more particularly, to a self-powered optical mouse device and an operating method thereof.

2. Description of the Related Art

An optical mouse device usually includes a light source and an image sensor. In power consumption of the optical mouse device, a light source consumes the greatest part of the power consumption. Therefore, how to lower the power consumption of the light source is an important issue.

Conventionally, when the optical mouse device is not operated for a period of time, total power consumption can be lowered by lowering the intensity of illumination of the light source or data retrieving speed of the image sensor.

However, as mentioned above, so far optical mouse devices are designed as lowering the power consumption but not designed to feed optical energy of the light source back to supplying power of the optical mouse devices in operation.

Accordingly, the present disclosure provides an optical mouse device which can provide a part of the optical energy of the light source as electrical energy for operating the optical mouse device so as to improve the utilization efficiency of energy.

SUMMARY

The present disclosure provides an optical mouse device which converts a part of light energy of a system light source included therein to electrical energy for operating the optical mouse device.

The present disclosure provides an optical sensor device including a housing and an image sensing array. The image sensing array is disposed in the housing, and includes a plurality of sensing pixels and a plurality of self-powered pixels. The sensing pixels and the self-powered pixels are arranged at interleaved positions of the image sensor array.

The present disclosure provides an optical sensor device including a housing and an image sensing array. The image sensing array is disposed in the housing, and includes a plurality of sensing pixels and a plurality of self-powered pixels. Each of the sensing pixels is configured to output image data for calculating displacement. Each of the self-powered pixels is configured to output photocurrent for being reused. The sensing pixels and the self-powered pixels are arranged at interleaved positions of the image sensor array.

The present disclosure provides an optical sensor device including a housing and an image sensing array. The image sensing array is disposed in the housing, and includes a plurality of sensing pixels and a plurality of self-powered pixels. Each of the sensing pixels is configured to output image data for calculating displacement. Each of the self-powered pixels is configured to output photocurrent for being reused. The self-powered pixels are arranged at a plurality of regions of the image sensor array and each of the plurality of regions includes multiple self-powered pixels, and the sensing pixels are arranged at the rest pixels of the image sensor array.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
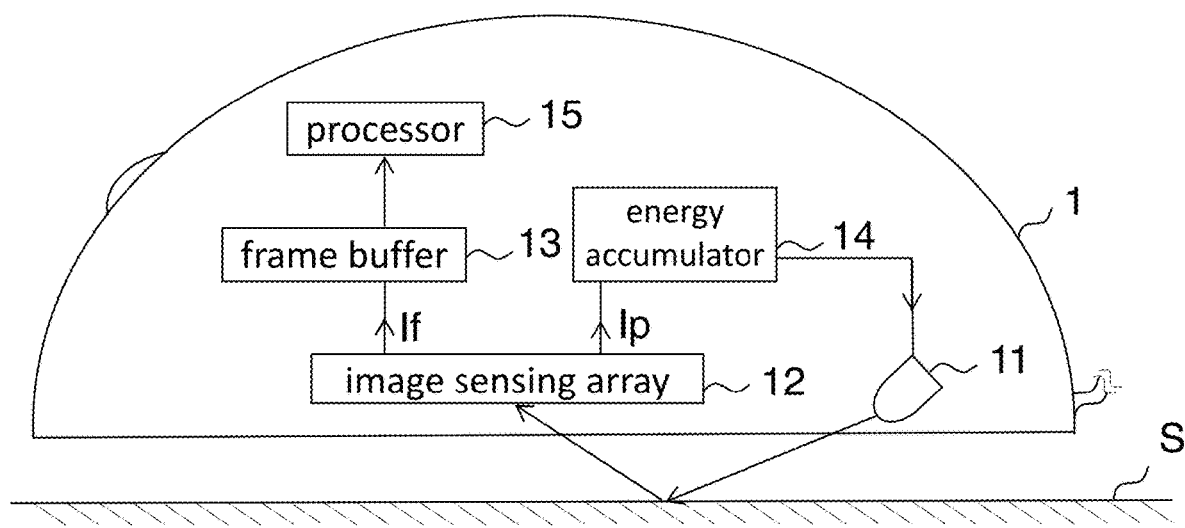
FIG. 1 is a schematic diagram of an optical mouse device according to one embodiment of the present disclosure.

Please refer to FIG. 1, it is a schematic diagram of an optical mouse device 1 according to one embodiment of the present disclosure. The optical mouse device 1 includes a light source 11, an image sensing array 12, a frame buffer 13, an energy accumulator 14 and a processor 15. In some embodiments, the optical mouse device 1 is operated on a working surface S and configured to detect a movement relative to the working surface S.

The light source 11 is, for example, an active light source configured to emit light of identifiable spectrum for illuminating the working surface S. In some embodiments, the light source 11 is, for example, a light emitting diode or a laser diode configured to emit red light and/or infrared light. In some embodiments, the optical mouse device 1 further includes an optical element, such as a lens configured to adjust an illumination field of the light source 11.

The image sensing array 12 is, for example, included in an image sensor, and configured to sense light energy of reflected light of the light source 11 reflected by the working surface S. The image sensor is, for example, an active sensor including a substrate layer. The substrate layer is manufactured by the semiconductor process to include a plurality of sensing pixels and a plurality of self-powered pixels (described hereinafter in detail). The sensing pixels are configured to respectively output image data If according to sensed light energy of the reflected light, and the self-powered pixels are configured to respectively output photocurrent Ip according to sensed light energy of the reflected light.

In the present disclosure, the image data If is configured to be provided to the processor 15 for calculating a displacement. For example, the processor 15 calculates the displacement by comparing the image data If of two image frames, wherein an image frame is referred to the image data If outputted by scanning the sensing pixels within one scanning period. The sensing pixels may have conventional pixel structures having three transistors (3T) or four transistors (4T) without particular limitations. For example, the sensing pixels have the pixel structure of conventional CMOS image sensors.

In the present disclosure, the photocurrent Ip is configured to be provided to the light source 11 for emitting light. For example, the self-powered pixels are coupled to at least one energy accumulator 14, which is configured to store electrical energy of the photocurrent Ip, wherein the electrical energy is mainly configured to be provided to the light source 11, but not to limited thereto. In some embodiments, the optical mouse device 1 includes, for example, a capacitor as the energy accumulator 14. All of the self-powered pixels are coupled to the capacitor. In some embodiments, the optical mouse device 1 includes, for example, a plurality of capacitors as the energy accumulator 14. The self-powered pixels are divided into a plurality of regions, and the self-powered pixels in each region are coupled to one capacitor, e.g., each row or column of self-powered pixels is coupled to one capacitor, but not limited thereto. The at least one energy accumulator 14 is coupled to the light source 11, and configured to provide the stored electrical energy to the light source 11 for illuminating light.

The processor 15 is, for example, a digital signal processor (DSP), a microcontroller or an application specific integrated circuit (ASIC). The processor 15 is configured to calculate a displacement according to the image data If outputted by the sensing pixels, e.g., calculating the displacement according to the correlation between two image frames, and identify an operation mode. When the calculated displacement is larger than a displacement threshold, a first mode is maintained; whereas, when the displacement is smaller than the displacement threshold, a second mode is entered. In the present disclosure, the first mode is referred to, for example, a mode that the processor detects displacements and outputs the displacements at a report rate. The second mode is referred to, for example, a mode that the processor 15 detects the optical mouse device 1 being substantially at a steady state, and the operation of at least a part of components is slowed down or disabled. It should be mentioned that the first mode is referred to a normal mode, and the second mode is referred to a sleeping mode herein, but not limited thereto. The normal mode and the sleeping mode are only intended to illustrate states of different modes.

In the present disclosure, in the first mode the sensing pixels and the self-powered pixels are both in operation; whereas, in the second mode the sensing pixels are deactivated (or turned off) and the self-powered pixels are continuously in operation (or turned on). It means that the self-powered pixels output the photocurrent Ip in both the first mode and second mode, and the photocurrent Ip generated in different modes may have different functions. The sensing pixels being deactivated in the second mode is referred to not outputting the image data If. For example, the transistor in the pixel circuit for controlling the outputting of the image data If is not conducted, and the sensing pixels output the image data If only in the first mode.

The frame buffer 13 is, for example, a volatile memory or a buffer, and configured to store the image data If outputted by the sensing pixels or store intensity data corresponding to the photocurrent Ip outputted by the self-powered pixels. To be more precisely, in the present disclosure, the frame buffer 13 is, in the first mode, coupled to the sensing pixels but not coupled to the self-powered pixels so as to store the image data If outputted by the sensing pixels. The frame buffer 13 is, in the second mode, coupled to the self-powered pixels but not coupled to the sensing pixels so as to store the intensity data corresponding to the photocurrent Ip outputted by the self-powered pixels, wherein the intensity data is also referred to gray values.

In one embodiment, the optical mouse device 1 includes, for example, a multiplexer 17 coupled between the frame buffer 13 and the self-powered pixels as well as the sensing pixels. When the processor 15 identifies that the first mode is entered, the processor 15 controls the multiplexer 17 to electrically connect the frame buffer 13 to the sensing pixels to temporally store the image data If. When the processor 15 identifies that the second mode is entered, the processor 15 controls the multiplexer 17 to electrically connect the frame buffer 13 to the self-powered pixels to temporally store the intensity data associated with the photocurrent Ip. It should be mentioned that using a multiplexer is just one embodiment, and the present disclosure is not limited thereto. It is possible to use other switches as long as the purpose of switching can be implemented.

The processor 15 is configured to calculate the displacement according to the image data If in the frame buffer 13, and identify whether to leave the second mode according to a value variation of the intensity data stored in the frame buffer 13. As mentioned above, in the second mode the self-powered pixels store the intensity data related to the photocurrent Ip into the frame buffer 13, and the processor 15 compares a value variation of the intensity data corresponding to photocurrent Ip between two image frames, wherein one image frame refers to photocurrent Ip outputted by scanning the self-powered pixels within one scanning period. In the present disclosure, a frame rate of the self-powered pixels is lower than that of the sensing pixels. When a value variation of the intensity data exceeds a variation threshold, it means that the optical mouse device 1 has a movement, and thus the processor 15 identifies that the second mode should be left. When the value variation of the intensity data does not exceed the variation threshold, it means that the optical mouse device 1 is not moved, and thus the processor 15 identifies that the second mode should be maintained. In some embodiments, the processor 15 calculates a correlation between intensity data related to photocurrent Ip of two image frames. When the correlation is lower than a predetermined threshold, it means that a movement occurs; on the contrary, no movement occurs. Furthermore, it is possible to identify the value variation by using other conventional ways without particular limitations, such as identifying a similarity between two image frames.

Figure 2A:
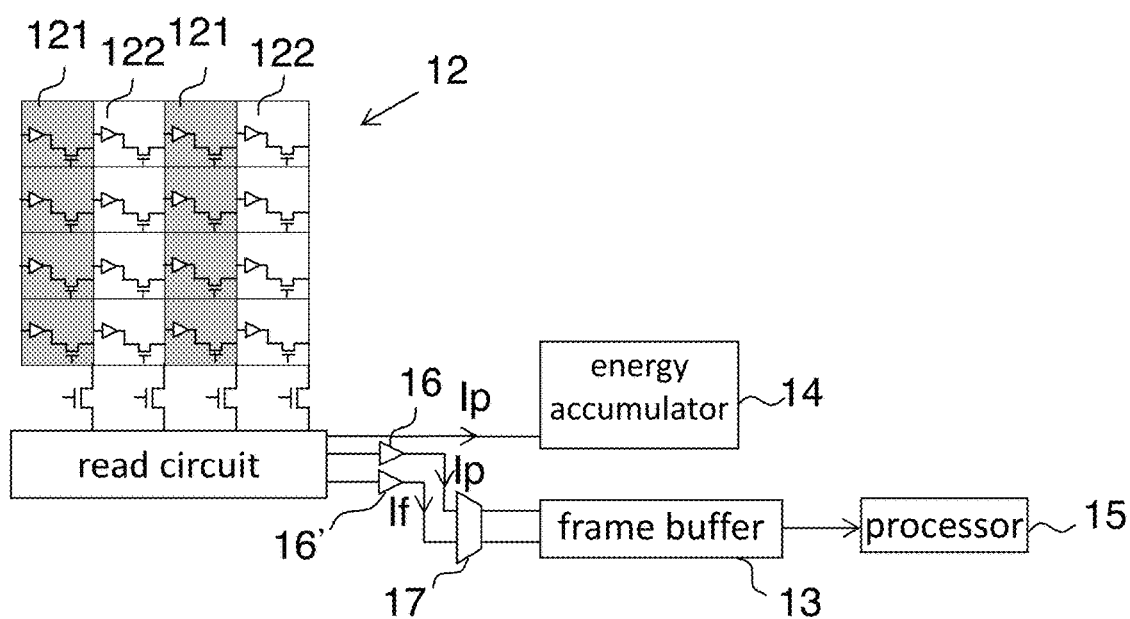
FIGS. 2A-2C are schematic diagrams of the pixel arrangement of an image sensing array according to some embodiments of the present disclosure, wherein the image sensing array includes self-powered pixels.
Figure 2B:
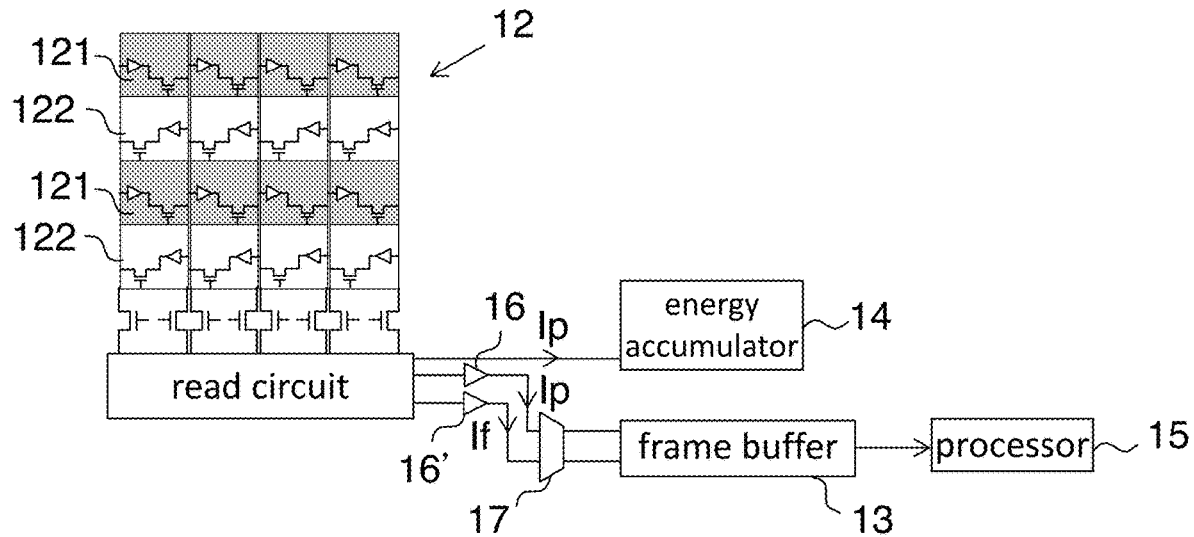
Figure 2C:
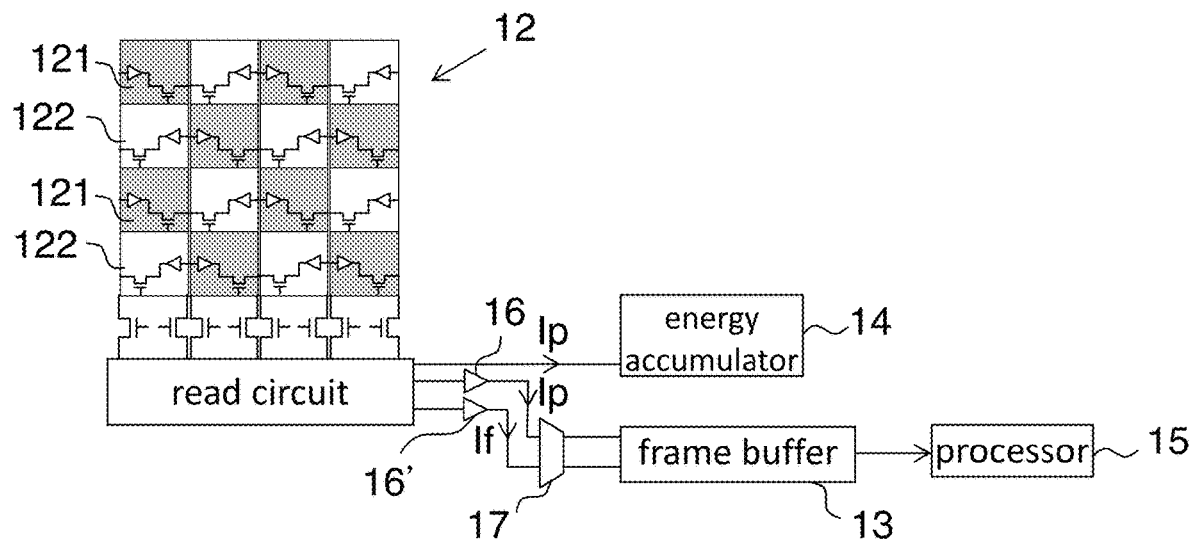

Please refer to FIG. 2A to 2C, they are schematic diagrams of the pixel arrangement of an image sensing array 12 according to some embodiments of the present disclosure. As mentioned above, the image sensing array 12 includes a plurality of sensing pixels 121 and a plurality of self-powered pixels 122. In some embodiments, the self-powered pixels 122 are arranged in a part of pixel rows (e.g., FIG. 2B) or pixel columns (e.g., FIG. 2A), and the plurality of pixel rows or pixel columns of the self-powered pixels 122 are not adjacent to each other. As shown in FIGS. 2A and 2B, one row (or column) of sensing pixels 121 is arranged between two rows (or columns) of self-powered pixels 122. In some embodiments, the sensing pixels 121 and the self-powered pixels 122 are arranged as a checkerboard pattern, as shown in FIG. 2C.

As mentioned above, the processor 15 is configured to calculate a displacement according to image data If outputted by the sensing pixels 121. As the sensing pixels 121 are not completely adjacent to each other, the processor 15 further performs an interpolation on the image data If before calculating the displacement and calculates the displacement according to the interpolated image data to improve the calculation accuracy.

For example, when pixels of the image sensing array 12 are arranged as those shown in FIG. 2C, pixel data of a pixel positon (1,2) is obtainable by interpolating pixel data of pixel positions (1,1), (2,2) and (1,3), and pixel data of a pixel positon (1,4) is obtainable by interpolating pixel data of pixel positions (1,3) and (2,4), and so on. It should be mentioned that a method of the interpolation is not limited to those given in the present disclosure.

Please refer to FIGS. 2A to 2C again, the optical mouse device 1 includes, for example, a read circuit coupled to the image sensing array 12 and configured to read pixel data of the sensing pixels 121 and self-powered pixels 122. The read circuit is, for example, a correlated double sampling circuit, and coupled with two read lines. One of the read lines is coupled to the sensing pixels 121 and the frame buffer 13, and configured to output image data If. The other one of the read lines is coupled to the self-powered pixels 122 and the frame buffer 13, and configured to output photocurrent Ip. Furthermore, the optical mouse device 1 further includes a charge path which is coupled to the self-powered pixels 122 and the energy accumulator 14, and configured to store the photocurrent Ip to the energy accumulator 14, wherein the charge path forms, for example, a bus to transport the photocurrent Ip outputted by a part or all of the self-powered pixels 122. As mentioned above, the optical mouse device 1 further includes a switching device (e.g. the multiplexer 17) to switch between different connections in a first mode and a second mode to couple the frame buffer 13 to the self-powered pixels 122 or to the sensing pixels 121. In addition, analog to digital convertors (ADC) 16 and 16' are arranged between the read circuit and the frame buffer 13 for converting the pixel data into digital signals to be stored in the frame buffer 13.

Figure 3:
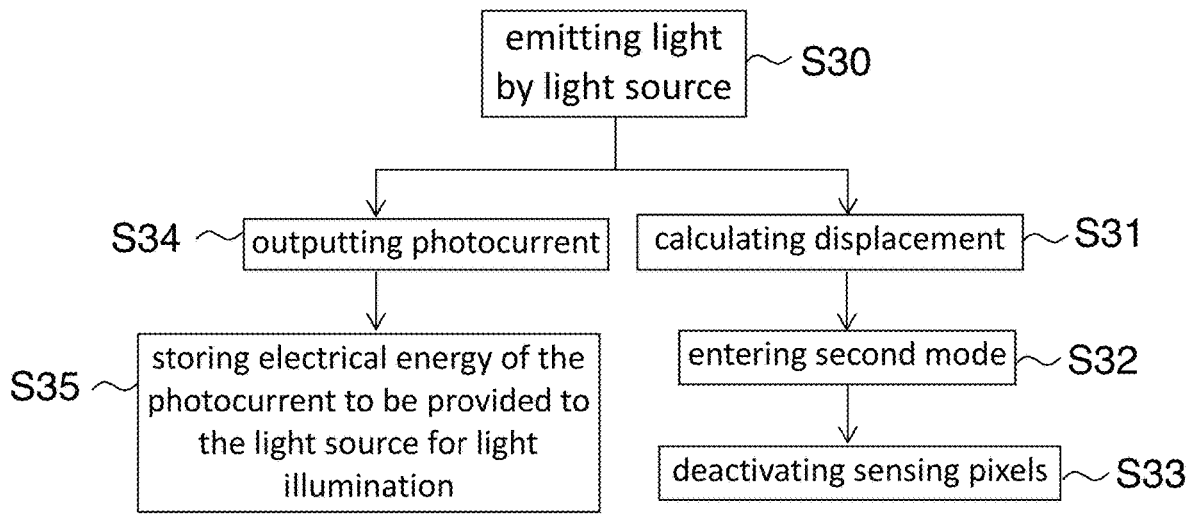
FIG. 3 is a flow chart of an operating method of an optical mouse device according to one embodiment of the present disclosure.

Please refer to FIG. 3, it is a flow chart of an operating method of an optical mouse device according to one embodiment of the present disclosure. The operating method is adaptable to the optical mouse device 1 as shown in FIG. 1. In a first mode, a light source 11 illuminates a working surface S, and an image sensing array 12 including a plurality of sensing pixels 121 and a plurality of self-powered pixels 122 is configured to sense light energy of reflected light from the working surface S. The sensing pixels 121 are coupled to a frame buffer 13 and configured to store the image data If into the frame buffer 13. The processor 15 reads the image data If from the frame buffer 13 to calculate a displacement. The self-powered pixels 122 are coupled to at least one energy accumulator 14 and configured to store electrical energy of the photocurrent Ip to the energy accumulator 14. The energy accumulator 14 is, for example, coupled to the light source 11 to provide electrical energy required in the illumination of the light source 11.

The operating method of the present disclosure includes the steps of: emitting light by a light source (step S30); calculating a displacement according to image data outputted by a plurality of sensing pixels (step S31); entering a second mode when the displacement is smaller than a displacement threshold (step S32); deactivating the sensing pixels in the second mode (step S33); respectively outputting photocurrent by a plurality of self-powered pixels (step S34); and storing electrical energy of the photocurrent into at least one energy accumulator to be provided to a light source for light illumination (step S35).

Figure 4:
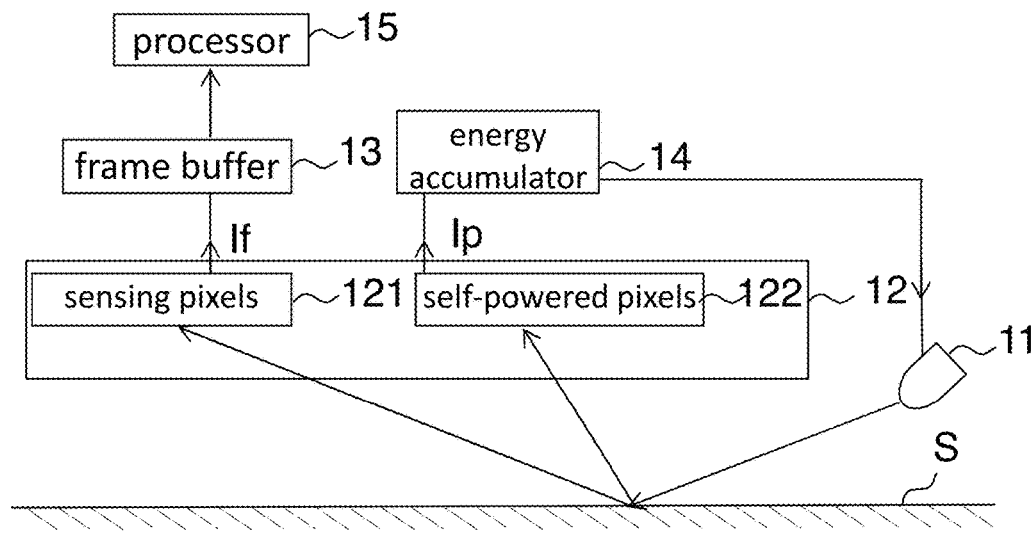
FIG. 4 is an operational schematic diagram of an operating method of a first mode of an optical mouse device according to one embodiment of the present disclosure.

Please refer to FIGS. 3 and 4, FIG. 4 is an operational schematic diagram of a first mode of an optical mouse device according to one embodiment of the present disclosure. In the first mode, the sensing pixels 121 sense light energy of the light source 11 to respectively output image data If to the frame buffer 13. The processor 15 then calculates a displacement according to the image data If (Steps S30, S31). As mentioned above, as the sensing pixels 121 are not continuously arranged, preferably the processor 15 performs an interpolation on the image data If before calculating the displacement to correctly obtain the displacement. When the processor 15 identifies that the displacement is larger than a displacement threshold, the optical mouse device 1 keeps on operating in the first mode. When the processor 15 identifies that the displacement is smaller than the displacement threshold, the optical mouse device 1 enters a second mode (Step S32), e.g. deactivating (or turning off) the sensing pixels (Step S33) and slowing down or turning off the operation of a part of components. After entering the second mode, the self-powered pixels 122 continuously operate.

In the first mode, the self-powered pixels 122 sense light energy of the light source 11 and output photocurrent Ip to the at least one energy accumulator 14 (Steps S30, S34). The electrical energy stored in the at least one energy accumulator 14 from the photocurrent Ip is configured to provide operating energy of the optical mouse device 1 (Step S35), e.g., required in the illumination of the light source 11, but not limited thereto. It is possible to provide the electrical energy to other components of the optical mouse device 1.

Figure 5:
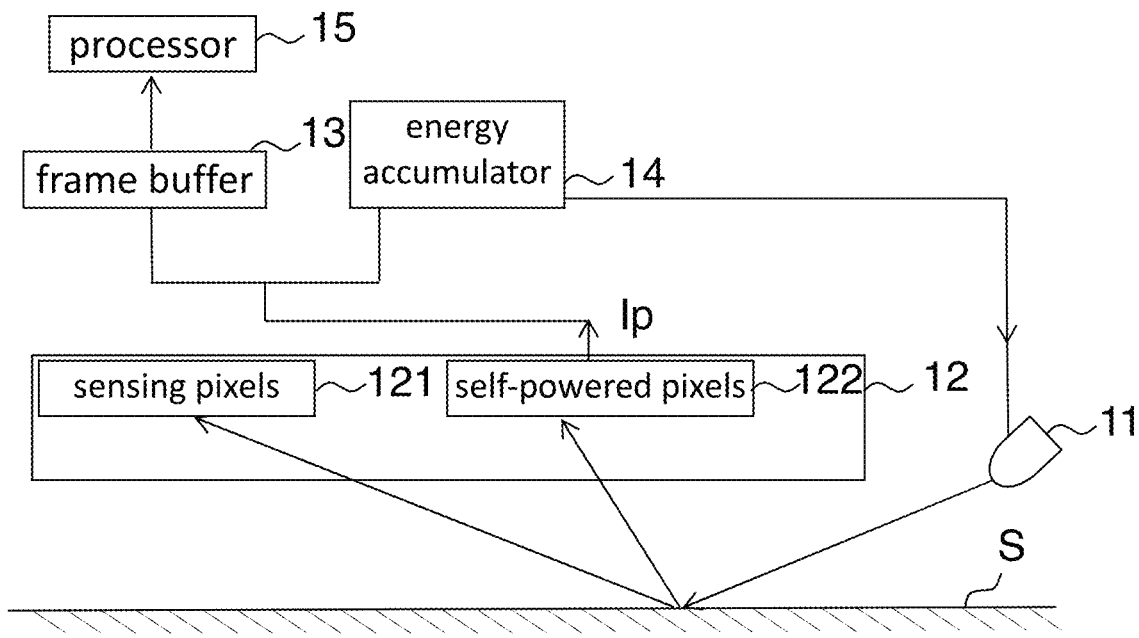
FIG. 5 is an operational schematic diagram of an operating method of a second mode of an optical mouse device according to one embodiment of the present disclosure.

Please refer to FIG. 5, it is an operational schematic diagram of a second mode of an optical mouse device according to one embodiment of the present disclosure that is also adaptable to the optical mouse device 1 in FIG. 1. In the second mode, the self-powered pixels 122 sense light energy of reflected light from the working surface S and generates photocurrent Ip. Similar to the first mode, the self-powered pixels 122 are coupled to at least one energy accumulator 14 which is configured to store energy of the photocurrent Ip being generated. The energy accumulator 14 is, for example, coupled to the light source 11 to provide the stored electrical energy to the light source 11 for light illumination. In addition, in the second mode, the self-powered pixels 122 are coupled to the frame buffer 13 to store the pixel data into the frame buffer 13 to be provided to the processor 15 for post-processing. To be more precisely, in the second mode, the self-powered pixels 122 may be coupled only to the frame buffer 13 or coupled to both the frame buffer 13 and the at least one energy accumulator 14.

In some embodiments, in the second mode the self-powered pixels 122 output intensity data corresponding to photocurrent Ip to be stored in the frame buffer 13. The processor 15 calculates a variation of the intensity value according to the intensity data to confirm whether to leave the second mode or not. For example, when a value variation of the intensity data is smaller than a variation threshold, the optical mouse device 1 maintains the operation in the second mode. When a value variation of the intensity data is larger than a variation threshold, the second mode is ended and the sensing pixels 121 are activated (or turned on) again to enter the first mode.

The value variation is, for example, referred to a value variation of the intensity data in two successive image frames compared by the processor 15 pixel-by-pixel. When a number of pixels, whose value variation exceed a variation threshold, is larger than a predetermined number, the second mode is identified to be left or ended.

It another embodiment, the processor 15, for example, calculates an average value of the intensity data of every frame, and when a value variation of the average value exceeds a variation threshold, the second mode is identified to be left or ended.

In another embodiment, the processor 15, for example, calculates a displacement according to the intensity data (as calculating the displacement according to image data If). When the calculated displacement is larger than a predetermined displacement, the second mode is identified to be left, wherein when the processor 15 calculates the displacement according to the intensity data, the processor 15 further performs an interpolation before calculating the displacement.

To save more electrical energy, the illumination intensity of the light source 11 in the second mode is selected to be lower than that in the first mode.

In the present disclosure, the image frame in the second mode is formed by pixel data outputted by the self-powered pixels 122, and the image frame in the first mode is formed by pixel data outputted by the sensing pixels 121.

Please refer to FIGS. 4 and 5, a plurality of self-powered pixels 122 are coupled to at least one energy accumulator 14 in both the first mode and the second mode, and output electrical energy of photocurrent Ip to be stored in the energy accumulator 14. The energy accumulator 14 is, for example, coupled to a light source 11 and provides electrical energy required in the illumination of the light source 11. In the second mode, the self-powered pixels 122 are further coupled to the frame buffer 13 to provide pixel data to the processor 15 for being further calculated to identify whether to leave the second mode or not.

Figure 6:
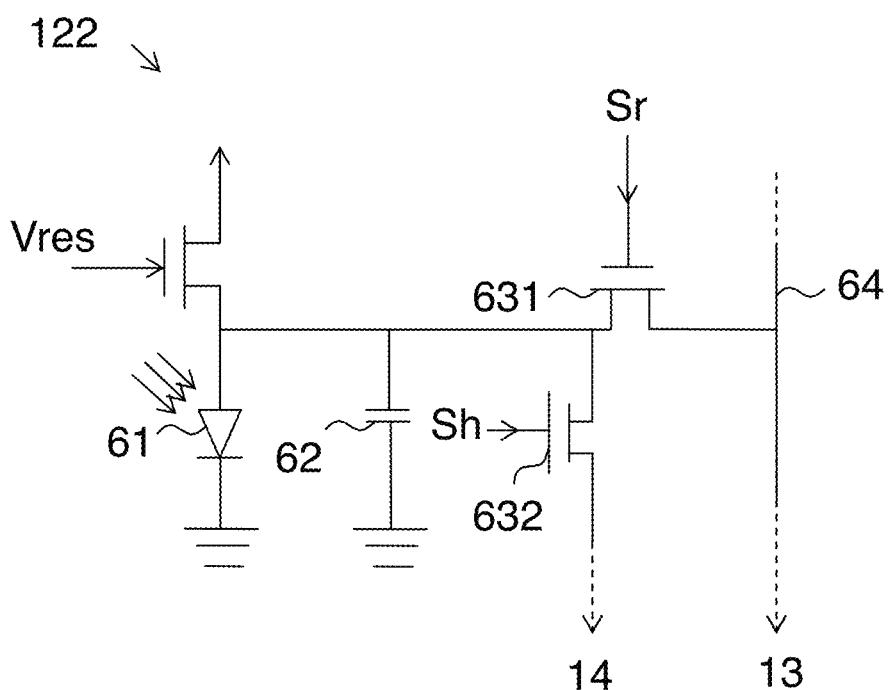
FIG. 6 is a schematic diagram of a pixel circuit according to one embodiment of the present disclosure.

Please refer to FIG. 6, it is a schematic circuit diagram of a pixel circuit according to one embodiment of the present disclosure. As mentioned above, the sensing pixels 121 may have conventional pixel structures having three transistors (3T) or four transistors (4T) without particular limitations. For example, the sensing pixels 122 include a photodiode 61, an energy storage structure 62 (for example, not limited to, a capacitor, a storage node or a floating diffusion node) and a read switch 631. The photodiode 61 is configured to convert optical energy to electrical energy. The energy storage structure 62 is configured to temporally store the electrical energy converted by the photodiode 61. The read switch 631 is configured to control the outputting of the electrical energy (i.e. image data If) stored in the energy storage structure 62 according to a row selection signal Sr to a readout line 64. The readout line 64 is, for example, coupled to the read circuit (as shown in FIGS. 2A to 2C) to store the outputted image data If to the frame buffer 13.

A pixel structure of the self-powered pixels 122 is not particularly limited. In addition to the photodiode 61, the energy storage structure 62 and the read switch 631, the self-powered pixels 122 further includes an energy storage switch 632 configured to output the photocurrent Ip converted by the photodiode 61 to the energy accumulator 14 according to an energy storage signal Sh, wherein the row selection signal Sr and the energy storage signal Sh are provided, for example, by a timing controller to simultaneously or sequentially conduct the corresponding switch. Similarly, the photodiode 61 is configured to convert light energy to photocurrent Ip. The read switch 631 is configured to control the photocurrent Ip to be outputted to a readout line 64. The readout line 64 is, for example, coupled to the read circuit (as shown in FIGS. 2A to 2C) to store the outputted photocurrent Ip to the frame buffer 13. Therefore, the photocurrent Ip converted by the photodiode 61 is able to be outputted to the energy accumulator 14 and/or the frame buffer 13 in different operation modes.

It should be mentioned that although descriptions above are explained using a mouse device operated on a table, the present disclosure is not limited thereto. In some embodiments, an image sensing array 12 of the present disclosure is also adaptable to, for example, an optical system including a system light source, such as an optical finger mouse or a proximity sensor so as to reuse a part of electrical energy.

The optical mouse device 1 of the present disclosure further includes a timing controller or a signal generator configured to generate timing signals to control the read circuit to read pixel data (including the image data If and photocurrent Ip) and control the on/off of every switching device (e.g., 17, 631 and 632).

The optical mouse device 1 further includes, for example, an output interface to output, at a report rate, the displacement calculated by the processor 15 to a host to correspondingly control a cursor movement. In some embodiments, the report rate is adjustable according to software currently operated by the host.

As mentioned above, the conventional optical mouse device does not have the electrical energy feedback mechanism, so the energy saving of total power consumption has an upper limit. Therefore, the present disclosure further provides a self-powered optical mouse device (as shown in FIGS. 1, 2A to 2C) and an operation method thereof that is able to store a part of light energy of a light source and feedback the stored energy to the light source to significantly improve the energy utilization efficiency of the optical mouse device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. An optical sensor device, comprising:
   a housing;
   an image sensing array, disposed in the housing, and the image sensing array comprising:

a plurality of sensing pixels; and
a plurality of self-powered pixels,
a frame buffer;
an energy accumulator;
first readout lines coupled between the plurality of self-powered pixels and the energy accumulator; and
second readout lines coupled between the plurality of self-powered pixels and the frame buffer,
wherein the sensing pixels and the self-powered pixels are arranged at interleaved positions of the image sensor array.

2. The optical sensor device as claimed in claim 1, further comprising:
a switch configured to couple the frame buffer to the plurality of self-powered pixels or the plurality of sensing pixels.

3. The optical sensor device as claimed in claim 1, further comprising a light source configured to provide light to be sensed by the plurality of self-powered pixels to generate photocurrent.

4. The optical sensor device as claimed in claim 3, wherein the photocurrent is further provided to the light source.

5. The optical sensor device as claimed in claim 1, wherein the first readout lines and the second readout lines are configured to read the plurality of self-powered pixels in different operation modes.

6. The optical sensor device as claimed in claim 1, wherein the plurality of sensing pixels and the plurality of self-powered pixels are arranged at interleaved rows, at interleaved columns or as a checkerboard pattern.

7. An optical sensor device, comprising:
a housing; and
an image sensing array, disposed in the housing, and the image sensing array comprising:
a plurality of sensing pixels, each of the sensing pixels being configured to output image data for calculating displacement; and
a plurality of self-powered pixels, each of the self-powered pixels being configured to output photocurrent for being reused,
wherein the sensing pixels and the self-powered pixels are arranged at interleaved positions of the image sensor array, and
a frame rate of the plurality of self-powered pixels is lower than that of the plurality of sensing pixels.

8. The optical sensor device as claimed in claim 7, further comprising:
a frame buffer; and
a switch configured to couple the frame buffer to the plurality of self-powered pixels or the plurality of sensing pixels.

9. The optical sensor device as claimed in claim 7, further comprising a light source configured to provide light to be sensed by the plurality of self-powered pixels to generate the photocurrent.

10. The optical sensor device as claimed in claim 7, wherein the photocurrent is further provided to the light source.

11. The optical sensor device as claimed in claim 7, further comprising:
a frame buffer;
an energy accumulator;
first readout lines coupled between the plurality of self-powered pixels and the energy accumulator; and
second readout lines coupled between the plurality of self-powered pixels and the frame buffer.

12. The optical sensor device as claimed in claim 11, wherein the first readout lines and the second readout lines are configured to read the plurality of self-powered pixels in different operation modes.

13. An optical sensor device, comprising:
a housing; and
an image sensing array, disposed in the housing, and the image sensing array comprising:
a plurality of sensing pixels, each of the sensing pixels being configured to output image data for calculating displacement; and
a plurality of self-powered pixels, each of the self-powered pixels being configured to output photocurrent for being reused,
wherein the self-powered pixels are arranged at a plurality of regions of the image sensor array and each of the plurality of regions includes multiple self-powered pixels, and the sensing pixels are arranged at the rest pixels of the image sensor array, and
a frame rate of the plurality of self-powered pixels is lower than that of the plurality of sensing pixels.

14. The optical sensor device as claimed in claim 13, further comprising:
a frame buffer; and
a switch configured to couple the frame buffer to the plurality of self-powered pixels or the plurality of sensing pixels.

15. The optical sensor device as claimed in claim 13, further comprising a light source configured to provide light to be sensed by the plurality of self-powered pixels to generate the photocurrent.

16. The optical sensor device as claimed in claim 15, wherein the photocurrent is further provided to the light source.

17. The optical sensor device as claimed in claim 13, further comprising:
a frame buffer;
an energy accumulator;
first readout lines coupled between the plurality of self-powered pixels and the energy accumulator; and
second readout lines coupled between the plurality of self-powered pixels and the frame buffer.

18. The optical sensor device as claimed in claim 17, wherein the first readout lines and the second readout lines are configured to read the plurality of self-powered pixels in different operation modes.

* * * * *